Feb. 21, 1928.
O. J. FETTER
1,660,121
FLUSHING DEVICE FOR DENTAL CUSPIDORS
Filed Sept. 29, 1926
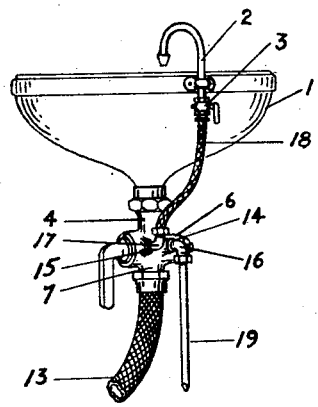
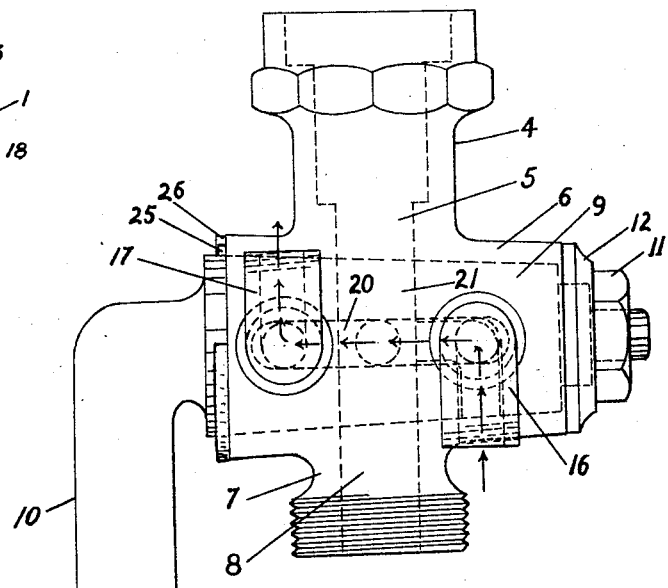
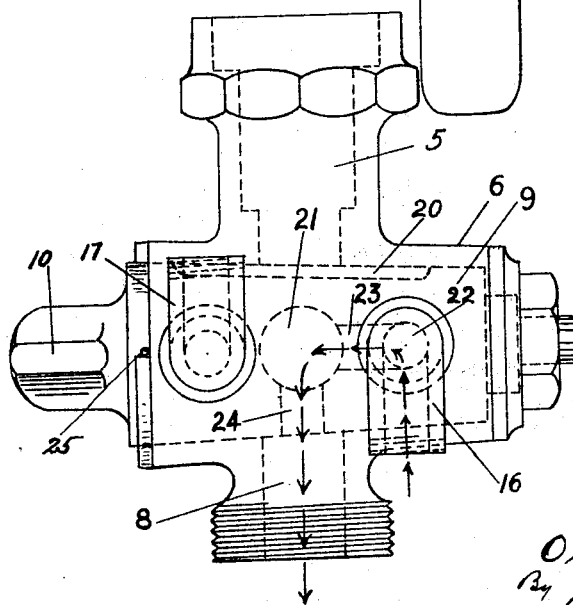
Inventor,
Orville J. Fetter,
By Arthur H. Ewald,
Attorney.

Patented Feb. 21, 1928.

1,660,121

UNITED STATES PATENT OFFICE.

ORVILLE J. FETTER, OF CINCINNATI, OHIO.

FLUSHING DEVICE FOR DENTAL CUSPIDORS.

Application filed September 29, 1926. Serial No. 138,554.

My invention relates to a device whereby the waste from a dental cuspidor may be flushed and the cuspidor thereby kept in a clean and sanitary condition.

The principal object of the present invention is to provide a simple and efficient valve mechanism whereby the waste from a dental cuspidor may be flushed by means of the supply water to the cuspidor. It is found in common practice that dental cuspidors unless frequently flushed become extremely filthy and unsanitary by reason of the continued expectoration of blood and other matter into the cuspidor. In order properly to flush the waste from the cuspidor it is necessary to perform the operation under pressure in order that the accumulated matters may be discharged through the waste of the cuspidor. This is accomplished in the present invention by the use of the full head or pressure of the supply to the cuspidor itself.

A further object of the invention is to provide in a flushing valve of the nature above described, when the water from the supply is turned into the waste of the cuspidor for flushing the same, the normal supply to the cuspidor itself is automatically disconnected, thereby avoiding the possibility of a flow of water into the cuspidor which would cause it to overflow and also preventing a division of the head or pressure of the water, so that the full effect of pressure may be used for the flushing operation.

Further objects of my invention will appear from the following detailed description thereof.

In the drawings:

Figure 1 is a perspective of a dental cuspidor equipped with a flushing valve in accordance with this invention.

Figure 2 is a phantom view of the invention showing the parts in position for furnishing the normal supply of water to the cuspidor, the waste from said cuspidor being open.

Figure 3 is a phantom view of the device showing the parts in relation to perform the flushing operation.

The numeral 1 indicates a dental cuspidor of any desired type, and 2 the water supply pipe thereto, the same being provided with a control valve 3.

The numeral 4 indicates a waste connection to the cuspidor provided with a channel 5 for the waste. Integrally formed with the connection 4 is a valve housing 6, the opposite side of which is provided with a threaded connection 7 having a channel 8 in alignment with the channel 5. The valve housing 6 is ground to provide a tight fit or seat for a valve member 9 operated by means of a lever 10, the said member being secured in the housing by means of a nut 11 and washer 12 in the usual manner. The threaded fitting 7 is arranged to have secured thereto a flexible or other discharge pipe 13. The valve housing 6 is provided with inlet and outlet bosses 14 and 15 respectively, the same being internally threaded for elbow fittings 16 and 17. The fitting 17 is connected to the valve 3 of the cuspidor by means of a flexible or other pipe 18, and the fitting 16 is connected to the water supply valve from the main by means of a pipe 19.

The valve member 9 is provided with a channel 20 which constitutes a groove in said member of such extension as to form a channel of communication between the inlet 16 and the outlet 17, as shown in Figure 2 of the drawings. The valve member is furthermore provided with a large bore 21 which is arranged to form a waste channel between the channels 5 and 8. Said valve member is furthermore provided with a transverse opening 22 and a longitudinal opening 23 in communication therewith, and with the large waste opening 21. Said member is also provided with a transverse bore 24 in communication with the waste bore 21. The opening 22 is in such position in the valve member as to be in communication with the inlet 16 when the valve member is rotated to the proper position. The valve member is provided with a pin 25 arranged to abut against shoulders 26 of the housing 6 so as to limit the movement of the valve member in the usual manner.

The operation of the device is as follows: When it is desired to furnish the normal water supply to the cuspidor 1, the valve member is rotated to the position shown in Figure 2, wherein the groove 20 provides a channel between the inlet 16 and outlet 17 of the valve housing. The normal water supply from the pipe 19 thus passes through the inlet 16, groove 20, outlet 17, and thence to the cuspidor. When the groove 20 is in this position the bore 21 is in alignment between the channels 5 and 8, and the waste from the cuspidor therefore discharges in the usual manner. When it is desired to flush the waste from the cuspidor for the purpose of cleansing and rendering the same sanitary, the valve member is given a quarter turn to the position shown in Figure 3; in this position the groove 20 is out of communication between the inlet 16 and outlet 17 and the water supply to the cuspidor is therefore automatically cut off without the necessity of manually operating the valve 3 and the cuspidor itself, and the possibility of neglect and consequent overflow of the cuspidor is thereby entirely obviated. In this position, furthermore, the waste bore 21 is out of communication between the channels 5 and 8 and the waste from the cuspidor is cut off. The supply from the pipe 19, however, in this position of the valve member, passes from the connection 16 of the housing through the transverse bore 22 and longitudinal bore 23 of the valve member, thence out from the channel 21 through the transverse bore 24, discharging into the channel 8 of the device and thus flushing the same with the full head or pressure of the water from the supply main, which pressure is not decreased or lessened by the diversion of the supply to the cuspidor itself, as would be the case if the valve member did not automatically disconnect the supply to the cuspidor and were the closing of the valve 3 neglected.

It will thus be seen that in the device as above described I provide a simple and efficient flushing device whereby the waste from the cuspidor may be flushed and the cuspidor rendered clean and sanitary, and wherein the danger of overflowing the cuspidor when the waste therefrom is cut off is entirely obviated.

Having thus fully described my invention, what I claim as new and desire to secure by Letters Patent is:

A device of the character described, comprising a valve housing adapted to be secured to the waste of a dental cuspidor, a waste channel through said housing, a rotatable valve member in said housing, said valve member being provided with a channel for said waste, inlet and outlet openings in said housing, a superficial groove in said valve member adapted to provide communication between said inlet and outlet openings, and a channel in said member providing communication between said inlet and the waste channel in the housing.

ORVILLE J. FETTER.